United States Patent
Eller et al.

(10) Patent No.: US 6,637,736 B2
(45) Date of Patent: Oct. 28, 2003

(54) BEARING ASSEMBLY FOR SUPPORTING COMPONENTS TO PERMIT LIMITED ROTATIONAL MOVEMENT

(75) Inventors: Gerhard Eller, Gehrden (DE); Jörg Hahnkamm, Seelze (DE); Ulrich Lantermann, Weidenhahn (DE)

(73) Assignee: Contitech Vibration Control GmbH, Hannover (DE)

( * ) Notice: Subject to any disclaimer, the term of this patent is extended or adjusted under 35 U.S.C. 154(b) by 0 days.

(21) Appl. No.: 10/114,253

(22) Filed: Apr. 3, 2002

(65) Prior Publication Data

US 2002/0140142 A1 Oct. 3, 2002

(30) Foreign Application Priority Data

Apr. 3, 2001 (DE) .......................................... 101 16 603

(51) Int. Cl.[7] .............................................. B60G 11/22
(52) U.S. Cl. ...................................... 267/279; 384/221
(58) Field of Search ................................ 267/273, 276, 267/277, 278, 279, 280, 282, 283, 284, 285, 292, 293; 384/221, 231

(56) References Cited

U.S. PATENT DOCUMENTS

| | | | | |
|---|---|---|---|---|
| 2,158,028 A | * | 5/1939 | Burke | 267/33 |
| 2,203,342 A | * | 6/1940 | Sloman et al. | 267/280 |
| 2,231,037 A | * | 2/1941 | Taylor | 267/280 |
| 2,873,110 A | * | 2/1959 | Johsson | 267/280 |
| 3,124,342 A | * | 3/1964 | Ormond | 267/154 |
| 4,040,690 A | * | 8/1977 | Finney | 384/221 |
| 4,142,833 A | * | 3/1979 | Rybicki et al. | 416/134 A |
| 4,913,411 A | * | 4/1990 | Collins et al. | 267/141.5 |
| 6,241,224 B1 | * | 6/2001 | Leibman | 267/279 |

FOREIGN PATENT DOCUMENTS

| | | |
|---|---|---|
| DE | 753 841 | 8/1944 |
| DE | 197 45 380 | 4/1998 |

* cited by examiner

Primary Examiner—Christopher P. Schwartz
Assistant Examiner—Xuan Lan Nguyen
(74) Attorney, Agent, or Firm—Walter Ottesen

(57) ABSTRACT

A bearing assembly permits limited rotational movement of component parts and includes a bearing body and a deflectable rotational body attached to the component part. The rotational body is disposed at a distance from the bearing body so that the bodies conjointly define a space therebetween. An intermediate element is disposed in this space and is connected to the bearing body and the rotational body. The intermediate element includes an axial component and a radial component and these components extend one into the other to form a layer so as to prevent a direct contact of the bodies with each other even under a dynamic loading of the bearing assembly while at the same time facilitating a limited rotational movement of the rotational body and the component part relative to the bearing body.

7 Claims, 4 Drawing Sheets

BEARING ASSEMBLY FOR SUPPORTING COMPONENTS TO PERMIT LIMITED ROTATIONAL MOVEMENT

FIELD OF THE INVENTION

The invention relates to a bearing assembly for supporting components for facilitating limited rotational movement. The components include the rear wheel support of a bicycle in the bicycle frame.

BACKGROUND OF THE INVENTION

The support and guidance of the rear wheel support of a bicycle in the bicycle frame has, up to now, been configured in many ways.

In German patent publication 197 45 380, a bicycle is disclosed having a suspension device which includes at least one torsion spring. This torsion spring includes an outer body and an inner part rotatably supported in the outer body. The outer body and the inner part are each connected to a part of the bicycle.

German Patent 753,841 discloses a bicycle having a rear wheel pivotable about the foot pedal crank axis. The rear wheel is made pivotable about the longitudinal axis of the foot pedal crank bearing by a U-shaped bracket and is spring suspended relative to the bicycle frame. The U-shaped bracket extends from the hub of the rear wheel. To realize this function, a rubber torsion spring is used which is connected concentrically to the foot pedal crank bearing and is connected to the bicycle frame. This solution is suitable for short spring paths but is subjected to increased wear when continuously loaded.

SUMMARY OF THE INVENTION

It is an object of the invention to provide a bearing assembly especially for the rear wheel support of a bicycle. It is a further object of the invention to provide such a bearing assembly which is simple in configuration and can be continuously subjected to load and can be used in a comparatively large rotational angle range.

The bearing assembly of the invention is for permitting a limited rotationally moveable support of a component part. The bearing assembly includes: a bearing body; a deflectable rotational body attached to the component part and disposed at a distance from the bearing body so that the bodies conjointly define a space therebetween; an intermediate element disposed in the space and connected to the bearing body and to the rotational body; and, the intermediate element including an axial component and a radial component and the components extending one into the other to form a layer so as to prevent a direct contact of the bodies with each other even under a dynamic loading of the bearing assembly while at the same time facilitating a limited rotational movement of the rotational body and the component part relative to the bearing body.

According to the invention, the intermediate element of the bearing assembly includes an axial component and a radial component which extend one into the other and form a layer in such a manner that a direct contact between the bearing body and the rotational body does not occur even under dynamic load of the bearing. The intermediate element ensures a permanent spacing between the bearing body and the rotational body.

The invention is associated with the advantage that a rotation of the parts of the bearing to each other is possible over a large rotational angular range without a negative influence on the durability of the bearing. The bearing is characterized by a high transverse stiffness so that a use, for example, for mounting, suspending and damping the rear wheel support of a bicycle is possible with a precise tracking.

In the preferred embodiment of the invention, the radially extended intermediate element is an elastomeric layer which permits coupling the required elasticity characteristics to a damping component. If the stressing of the material within the elastomeric layer is to be equalized with a rotation of the bearing components relative to each other, then it is provided that the thickness of the elastomeric layer increases with increasing distance from the center of the bearing.

The bearing body and the rotational body can be correspondingly configured to each other that a wave-shaped elastomeric layer arises which departs from a planar layer. With this measure, the possibility is provided to influence the spring deflection characteristic line and to achieve a progressive increase of the reaction force caused by the spring deflection operation in the elastomeric connection.

If the elastomeric layer runs essentially radially remote from the bearing center and essentially axially near the bearing center, then a balanced torsion performance of the bearing assembly can be connected to a high transverse force stability. A further qualitative improvement of the bearing characteristics occurs when a further bearing body or rotational body is provided so that two elastomeric layers are provided between the bearing bodies and the rotational bodies or between the rotational bodies and the bearing bodies. It is further practical to provide a symmetrical arrangement of the elastomeric layers to each other referred to the inner body of the bearing configured as the bearing body or the rotational body.

In a further embodiment of the invention, a device for generating a pretensioning in the elastomeric layer is provided. With such a device, the spring deflection characteristic line can be influenced in a targeted manner. Such a device for generating a pretension can be a threaded bushing wherein an axial change of length functions to adjust the degree of pretensioning.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
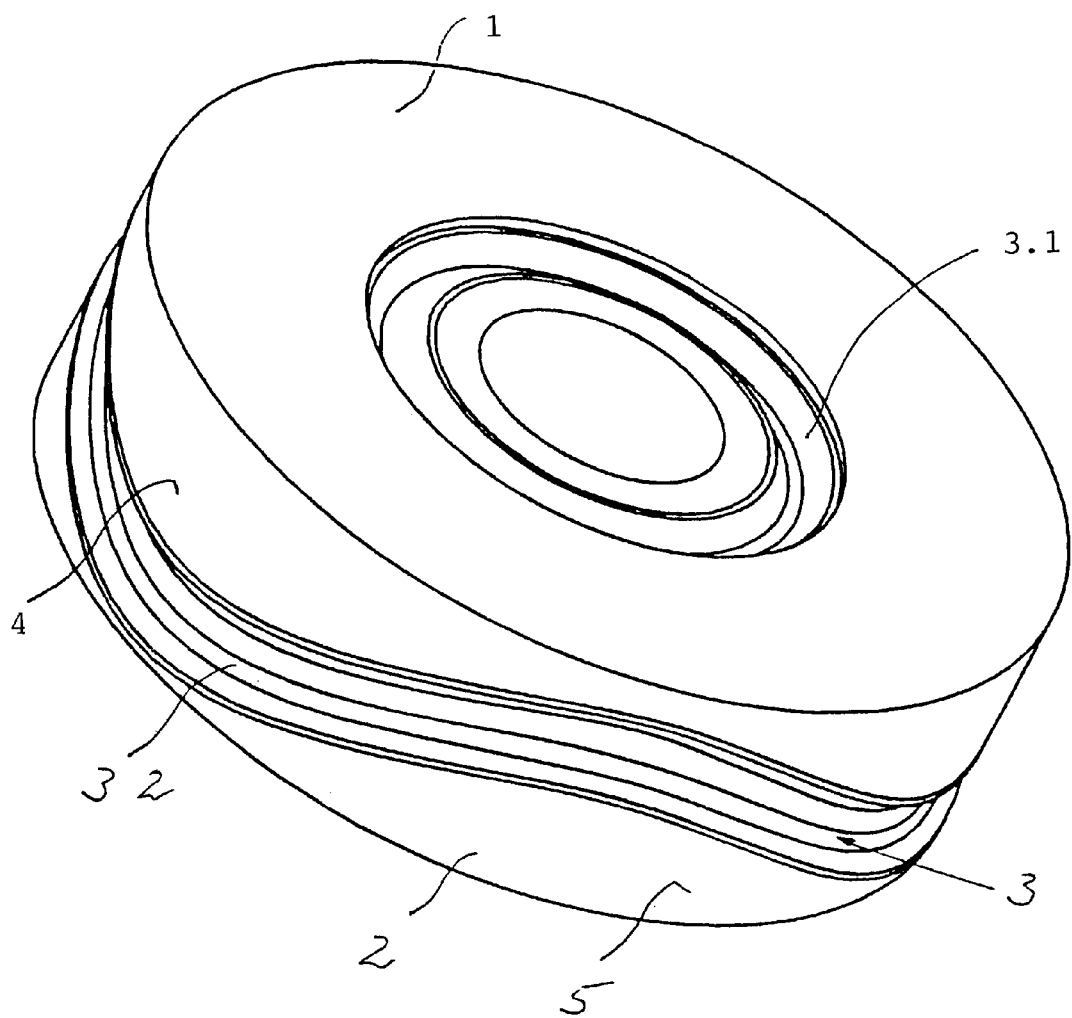
FIG. 1 is a perspective view of a bearing according to the invention.

The bearing assembly of the invention is shown in FIG. 1 and comprises a bearing body 1, a rotational body 2 and an intermediate element in the form of an elastomeric layer 3. The intermediate element makes possible a limited rotational movement between the bodies (1, 2). The elastomeric layer 3 includes a region 3.1, which runs essentially axially, and a region 3.2 which extends essentially radially. The region 3.2 extends up to the end faces (4, 5) of the bearing body 1 and the rotational body 2 so that a direct contact between the bearing body 1 and the rotational body 2 is precluded and a pretensioning of the elastomeric layer 3 can be achieved with the application of an axial force. To adjust the usable rotational angular sector and the force characteristic in this rotational angular sector, the radial region 3.2 is embedded wave-shaped between the bearing body 1 and the rotational body 2. The possibility is provided to influence the magnitude of the rotational angle sector and the force characteristic line curve via a change of the waveform which, for example, is effected by a change of the radius of curvature of the wave contour which can be seen externally.

Preferably, unvulcanized rubber can be used as the base material for the elastomeric layer which, after vulcanization, is bonded as rubber to bearing body 1 and rotational body 2.

Figure 2:
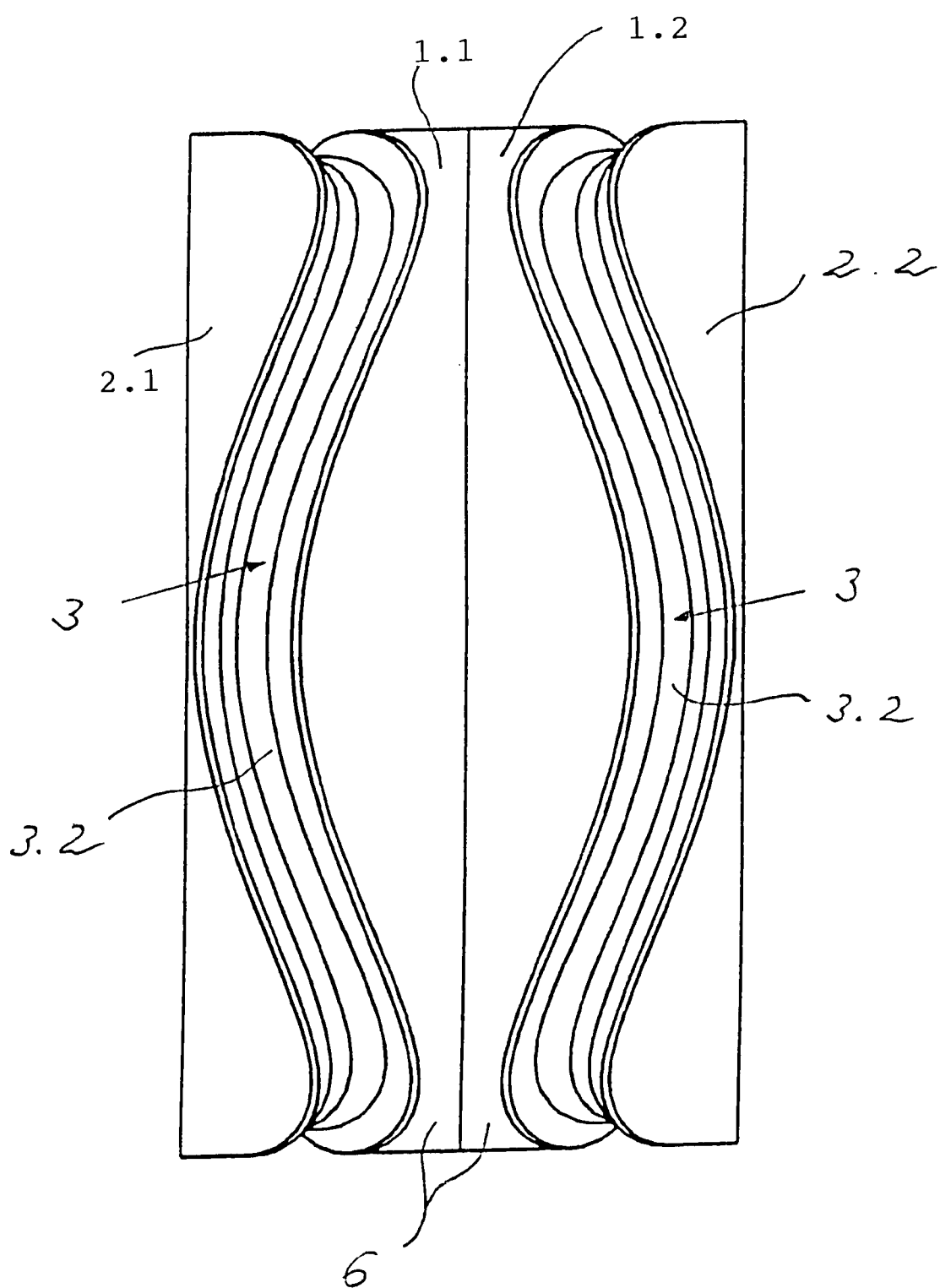
FIG. 2 is an end view of a bearing unit formed of two bearings of FIG. 1 and is for the rear wheel support of a bicycle.

The bearing assembly shown in FIG. 2 is for the mounting of a rear wheel support of a bicycle and comprises two bearings in accordance with the bearing shown in FIG. 1. The two bearings are so assembled that the curved radial region 3.2 of the elastomeric layer 3, referred to the contact plane of the two bearings, runs essentially symmetrically as can be seen in FIG. 2 for the outer-lying surfaces of the elastomeric layers 3. A rigid connection is provided between the two bearing bodies 1.1 and 1.2 so that the inner body 6 formed in this way can be rotated to a limited extent relative to the rotational bodies 2.1 and 2.2 and the rotational bodies 2.1 and 2.2 can rotate to a limited extent individually or together relative to the inner body 6.

Figure 3:
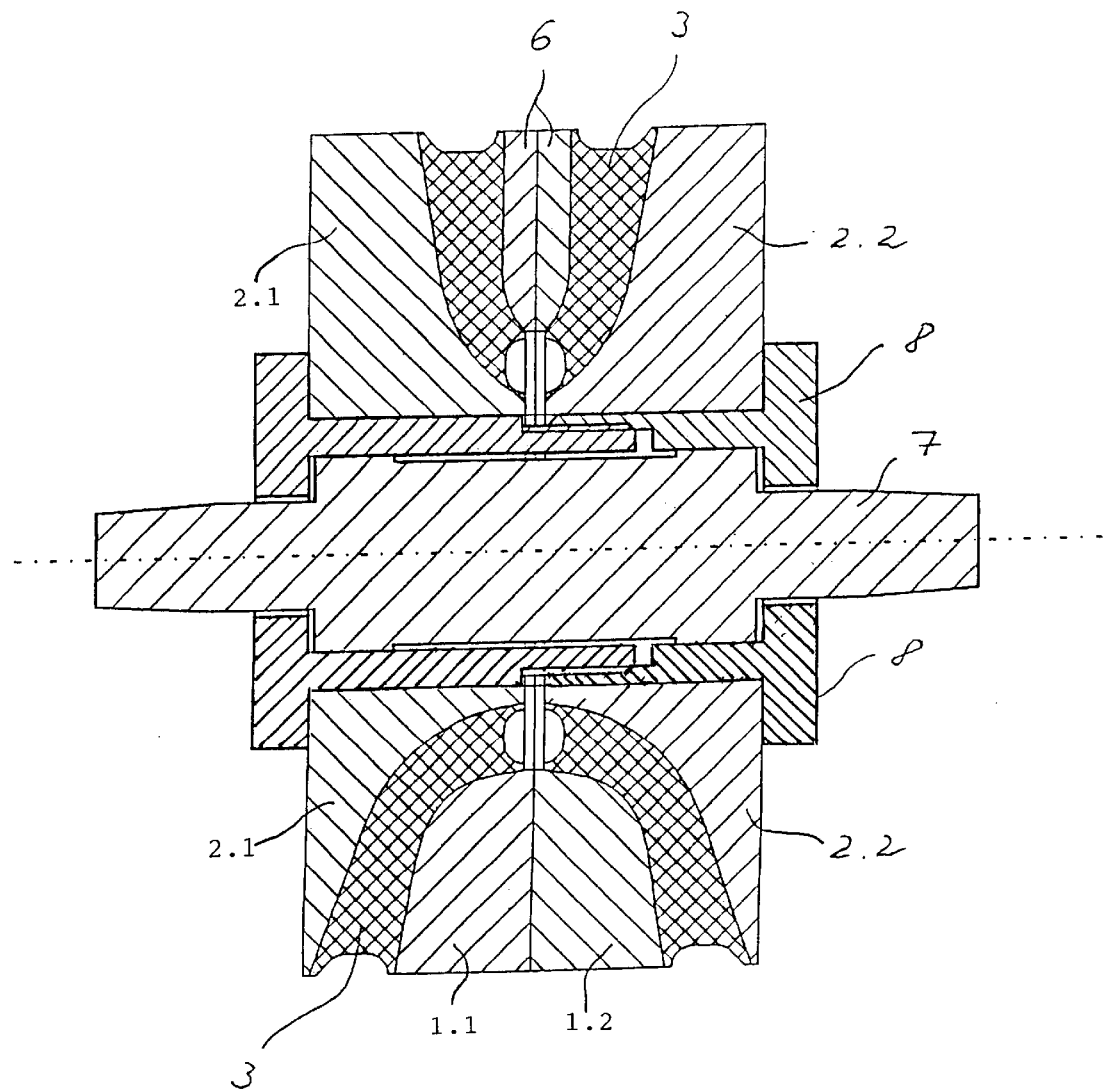
FIG. 3 shows the bearing of FIG. 2 mounted in position on a bicycle.

FIG. 3 shows a bearing assembly of FIG. 2 which includes a pedal shaft 7 of a bicycle. A threaded bushing 8 is provided between the foot pedal shaft 7 and the bearing assembly. With the threaded bushing 8, the bearing assembly can be pretensioned in order to adjust the bearing assembly to the specific load conditions. The configuration of the threaded bushing 8 is so selected that, in a pretensioned bearing assembly (in FIG. 3, a tension free condition is shown), the free rotational movement of the foot pedal shaft 7 is ensured.

Figure 4:
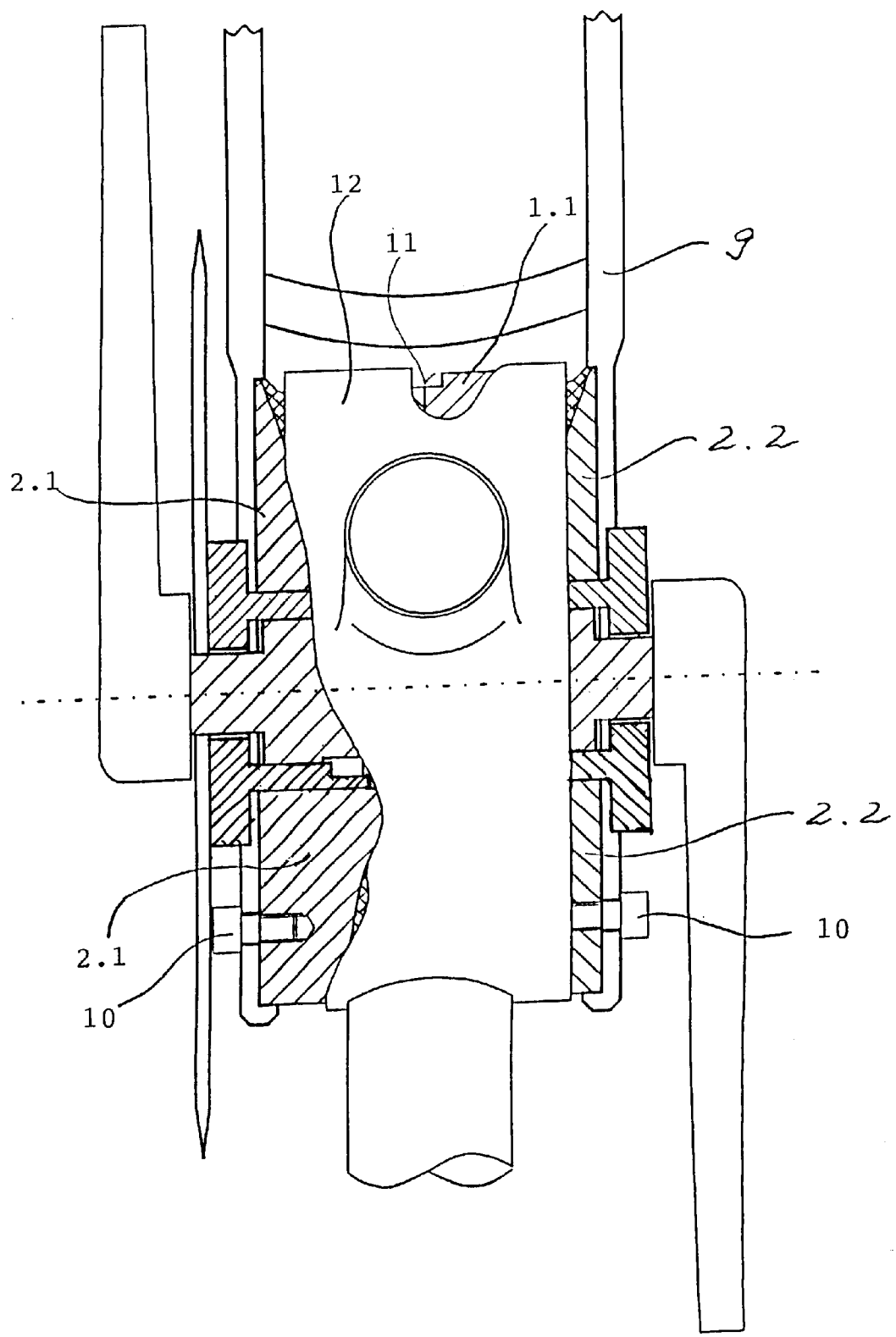
FIG. 4 shows the subject matter of FIG. 3 together with a rear wheel support of a bicycle attached to the bearing assembly.

As shown in FIG. 4, the rear wheel support 9 of a bicycle (not shown) is connected with screws 10 to the rotational bodies 2.1 and 2.2. Furthermore, the bearing bodies 1.1 and 1.2 include a cutout 11 in which a projection, which is provided on the bicycle frame 12, engages to ensure that the bearing bodies 1.1 and 1.2 will not rotate relative to the frame 12 of the bicycle.

When using the bicycle, the deflection operates counter to an increasing force developed by the elastomeric connection. As a consequence of the special symmetrical configuration of the bearing assembly, an exact path tracking of the rear wheel of the bicycle is ensured.

It is understood that the foregoing description is that of the preferred embodiments of the invention and that various changes and modifications may be made thereto without departing from the spirit and scope of the invention as defined in the appended claims.

What is claimed is:

1. A bearing assembly for permitting a limited rotationally moveable support of a component part the bearing assembly comprising:
    a bearing body;
    a deflectable rotational body attached to said component part and disposed at a distance from said bearing body so that said bodies conjointly define a space therebetween;
    an intermediate element disposed in said space and connected to said bearing body and to said rotational body; and,
    said intermediate element including an axial component and a radial component and said components extending one into the other to form a layer so as to prevent a direct contact of said bodies with each other even under a dynamic loading of said bearing assembly while at the same time facilitating a limited rotational movement of said rotational body and said component part relative to said bearing body;
    said intermediate element is an elastomeric layer; and,
    said bearing assembly further comprises a device for generating a pretension in said elastomeric layer.

2. The bearing assembly of claim 1, said device comprising a threaded bushing and means for changing the axial length of said threaded bushing to adjust the degree of said pretension.

3. A bearing assembly for permitting a limited rotationally moveable support of first and second component parts, the bearing assembly comprising:
    a bearing body;
    a first deflectable rotational body attached to said first component part and disposed at a distance from said bearing body so that said bodies conjointly define a first space therebetween;
    a first intermediate element disposed in said first space and connected to said bearing body and to said first deflectable rotational body;
    said first intermediate element including an axial component and a radial component and said components extending one into the other to form a layer so as to prevent a direct contact of said first deflectable rotational body and said bearing body with each other even under a dynamic loading of said bearing assembly while at the same time facilitating a limited rotational movement of said first deflectable rotational body and said first component part relative to said bearing body;
    a second deflectable rotational body attached to said second component part and disposed at a distance from said bearing body so that said second deflectable rotational body and said bearing body conjointly define a second space therebetween;
    a second intermediate element disposed in said second space and connected to said bearing body and to said second deflectable rotational body;
    said second intermediate element including an axial component and a radial component and said components of said second intermediate element extending one into the other to form a layer so as to prevent a direct contact of said second deflectable rotational body and said bearing body with each other even under a dynamic loading of said bearing assembly while at the same time facilitating a limited rotational movement of said second deflectable rotational body and said second component part relative to said bearing body; and,
    said first and second intermediate elements being separate from each other and disposed on opposite sides of said bearing body.

4. The bearing assembly of claim 3, wherein said first and second components are left and right rear wheel supports of a two-wheel vehicle.

5. The bearing assembly of claim 4, wherein said two-wheel vehicle is a bicycle.

6. The bearing assembly of claim 3, wherein said first and second intermediate elements are elastomeric layers.

7. The bearing assembly of 3, wherein said bearing body is an inner body relative to said first and second rotational bodies; and, said first and second intermediate elements are arranged symmetrically to said bearing body.

* * * * *